United States Patent
Westerdahl et al.

(10) Patent No.: US 7,968,041 B2
(45) Date of Patent: Jun. 28, 2011

(54) METHOD OF MANUFACTURING AN ARTICLE OF FIBER-REINFORCED COMPOSITE MATERIAL

(75) Inventors: Anders Westerdahl, Linköping (SE); Ingemar Turesson, Linköping (SE)

(73) Assignee: SAAB AB, Linköping (SE)

( * ) Notice: Subject to any disclaimer, the term of this patent is extended or adjusted under 35 U.S.C. 154(b) by 202 days.

(21) Appl. No.: 12/238,562

(22) Filed: Sep. 26, 2008

(65) Prior Publication Data

US 2009/0084493 A1   Apr. 2, 2009

(30) Foreign Application Priority Data

Sep. 26, 2007   (EP) ..................................... 07117278

(51) Int. Cl.
*B29C 43/12* (2006.01)

(52) U.S. Cl. ........................................ 264/554; 156/285

(58) Field of Classification Search ................... 156/222, 156/223, 443, 285; 264/554

See application file for complete search history.

(56) References Cited

U.S. PATENT DOCUMENTS

| 6,083,448 A | 7/2000 | Henrio |
| 2006/0068170 A1 | 3/2006 | Hanson |

FOREIGN PATENT DOCUMENTS

| EP | 0860268 A1 | 8/1998 |
| EP | 0992336 A1 | 4/2000 |
| WO | WO-93/11922 A1 | 6/1993 |

OTHER PUBLICATIONS

European Search Report—Feb. 27, 2008.

*Primary Examiner* — Christina Johnson
*Assistant Examiner* — Galen Hauth
(74) *Attorney, Agent, or Firm* — Venable LLP; Eric J. Franklin

(57) ABSTRACT

A method and a tool component for forming in an article of fiber-reinforced composite material at least one locally placed, sharply curved portion. A separate, substantially rigid pressure-transferring element configured with a profile corresponding to the at least one curved portion is placed over the laminate at the location of the at least one locally placed, sharply curved portion of the mold surface. A flexible membrane placed over the laminate and over outer, separated surfaces of the pressure-transferring element is evacuated to depress the laminate to fully conform to the shape of the mold surface.

6 Claims, 3 Drawing Sheets

METHOD OF MANUFACTURING AN ARTICLE OF FIBER-REINFORCED COMPOSITE MATERIAL

CROSS-REFERENCE TO RELATED APPLICATIONS

This application claims priority to European patent application 07117278.7 filed 26 Sep. 2007.

BACKGROUND OF THE INVENTION

1. Field of the Invention

The present invention relates generally to a method of manufacturing an article of fiber-reinforced composite material. More particularly, the invention relates to a method of manufacturing an article of fiber-reinforced composite material having at least one locally placed, sharply curved portion, such as a recess, a groove, a protrusion, a ridge or the like.

The invention also relates to a specific tool component for forming in an article of fiber-reinforced composite material at least one locally placed, sharply curved portion.

2. Description of Related Art

When producing strong light-weight products of a fiber-reinforced composite material for e.g. the aircraft industry, such as control surfaces, flaps, doors, hatches, integral panels or the like, problems may arise to accurately form sharply curved recesses or protrusions in the product due to the limited ability of a flexible vacuum membrane to follow the profile of such sharply curved sections of the matrix and, hence, to properly depress the lay-up of a fiber sheet laminate into these sections during the evacuation of the membrane. This will necessitate the addition step of applying external forces to the membrane by means of an autoclave or the like. It is known to use auxiliary tool components to improve the forming of corner sections of products of fiber-reinforced composite material. US 2006/0068170 A1 discloses a method and a tooling aid for applying pressure on a fiber sheet laminate in order to properly form two opposite corner portions of an entirely U-shaped product. For this purpose a flexible U-shaped auxiliary tool element having a concavely curved web or base section and two opposite corner sections is positioned over the laminate in a female mold. When an enclosing sealed membrane is evacuated, the latter exerts a pressure on the flexible, curved base section of the tool element, thereby causing the base section to flex downwardly to stretch the underlying laminate while at the same time expanding the corner portions of the tool element outwardly towards the corresponding corner parts of the mold surface. However, such a tool element is not suitable for forming products of fiber-reinforced composite material having at least one locally placed, sharply curved portion, such as a recess forming a narrow groove or a protrusion forming a ridge of the product, i.e. where the membrane is not capable of depressing the laminate close enough to the mold surface.

Moreover, EP 0 992 336 A1 discloses use of one or more auxiliary stiff support elements for resin-impregnating and hardening of a preformed composite article, e.g. an L-shaped product, in a further process step following a pre-forming step, where the evacuation of flexible bags is not sufficient to support the composite material. Such support elements are not suitable as auxiliary tools for forming in one single thermoforming step and without using external forces of e.g. an autoclave locally placed, sharply curved portions in a lay-up of fiber sheets by using an enclosing evacuateable membrane.

SUMMARY OF THE INVENTION

It is a primary object of the present invention to provide an improved method of manufacturing an article of fiber-reinforced composite material in which at least one locally placed, sharply curved portion, such as a recess, a groove, a protrusion, a ridge or the like, may be formed in one single step by using the force of an evacuated flexible membrane without need for additional external forces. In this manner it is possible to minimize manual handling and lay-up of fiber sheets and use so-called tape layers to form a pre-impregnated laminate over a mold surface and to form the article in a single thermoforming process without having to pre-form the article in a preceding separate step, thereby saving time and production costs.

According to another aspect of the invention there is provided a specific tool component for forming in an article of fiber-reinforced composite material at least one locally placed, sharply curved portion. By engaging separate outer surface sections of the outside of the substantially rigid tool element the membrane needs not follow the configuration or profile of the narrow recess or protrusion, since the rigid tool element will by itself transfer and apply a necessary force locally onto the laminate at the location of the sharply curved portion to be formed in the article.

Other features and details of the method and tool of the present invention are set forth in the dependent claims and will be described in the following detailed description with reference to the accompanying drawings.

DETAILED DESCRIPTION OF A PREFERRED EMBODIMENT

Figure 1:
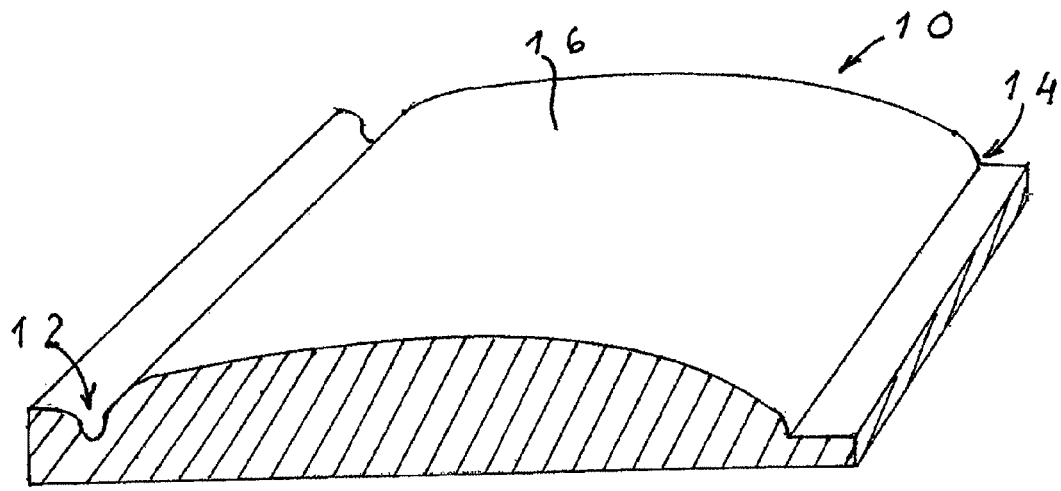
FIG. 1 is a schematic perspective view of a longitudinally and transversely cut section of a mold for forming one half of an aircraft control surface having sharply curved portions at longitudinal edge portions thereof.

FIG. 1 schematically illustrates, as an example, a longitudinally and transversely cut section of a mold 10 for forming in a thermoforming process an article of fiber-reinforced composite material. In particular, the process of the present invention is related to manufacturing of articles having sharply curved portions, such as recesses and protrusions, which are difficult to form only by means of a flexible, evacuateable membrane. In FIG. 1, the mold 10 is configured for forming one half of an aircraft control surface having sharply curved portions at front and rear longitudinal edges thereof. To this end the mold 10 has a groove-like recess 12 with a first, sharply curved profile at its one longitudinal edge portion and a second sharply curved profile 14 at its opposite longitudinal edge portion. Between the sharply curved profiles 12, 14 the mold 10 has a slightly curved section 16 following the inner profile of the control surface to be formed.

Figure 6:
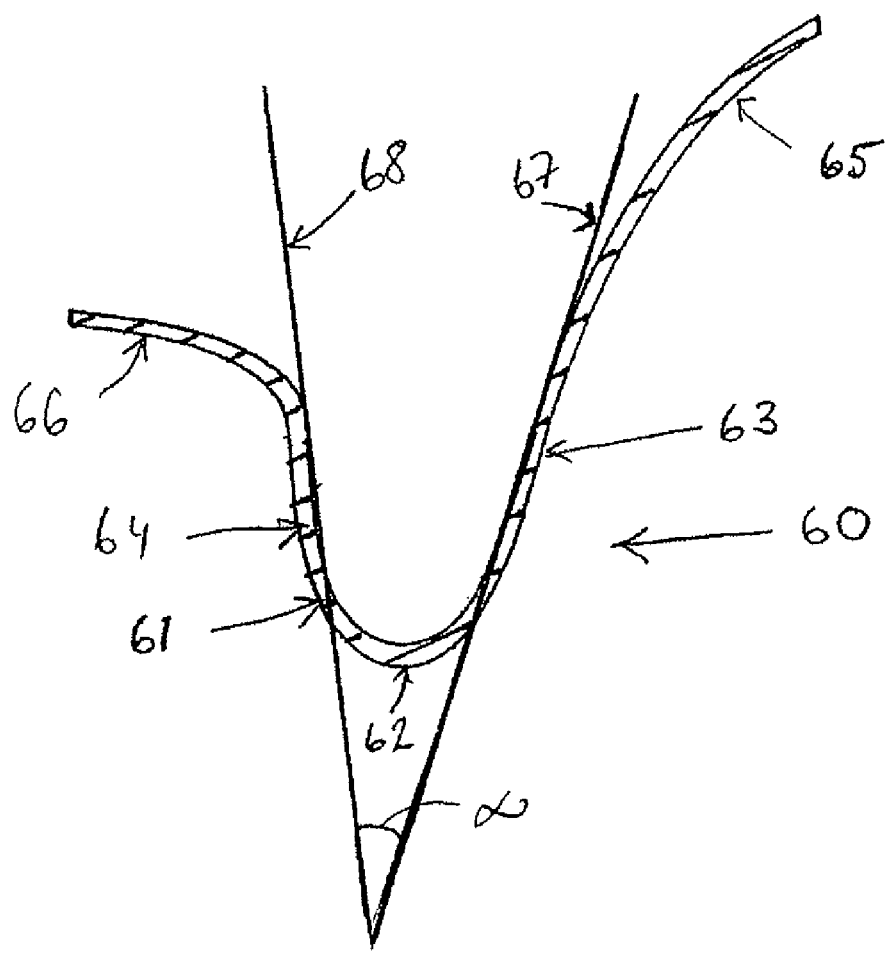
FIG. 6 is a schematic view of a sharply curved portion in a mold, a fiber-reinforced composite material or in a pressure-transferring element.

In FIG. 6 is a curved portion 60 shown for illustrating what is meant by a "sharply curved portion".

By "curved portion" is meant a portion in which a line drawn through the portion follows a curved line 61 having a point or tip part 62. On each side of the point or tip part 62 follows substantially linear or slightly curved part 63, 64 which together with the tip part 62 form a curved portion. The line then follows to two outer, separated parts 65, 66.

By "sharply curved portion" is meant a curved portion wherein a line 67, 68 drawn through and substantially parallel to each of the substantially linear or slightly curved parts 63, 64 on each side of the point or tip part 62 of the curved portion cut each other in an angle α which is less than 130°. The angle α is preferably less than 100° or more preferred less than 90°.

Figure 2:
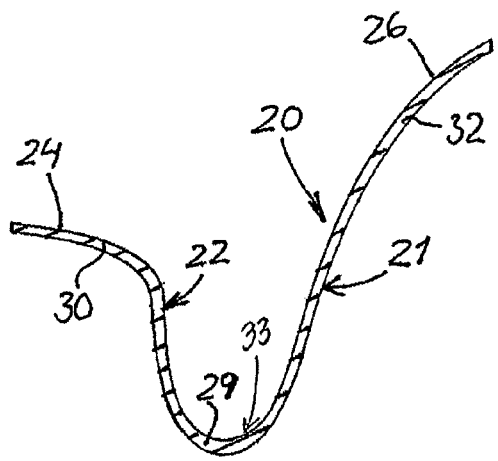
FIG. 2 is a schematic enlarged cross-sectional view of a substantially rigid pressure-transferring tool element of the invention for forming in the left part of FIG. 1 a first locally placed, sharply curved portion in an article of fiber-reinforced composite material.
Figure 4:
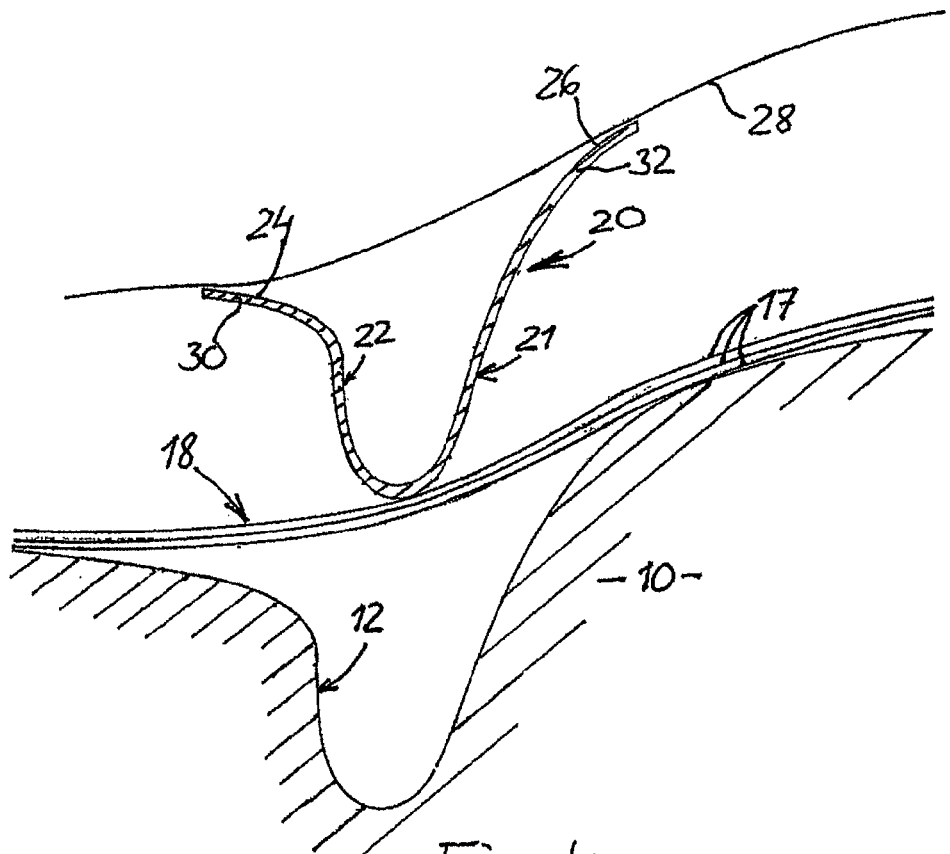
FIG. 4 is an enlarged schematic view of the left part of the mold in FIG. 1 with an assembly of a fiber sheet laminate, a pressure-transferring element and a flexible membrane placed over the profiled mold surface prior to an evacuation of the membrane.

In an initial step of the process a plurality of pre-impregnated fiber sheets 17 (see FIG. 4) are either laid up upon one another on a separate support surface by means of a tape-laying machine (not shown) to form a laminate or lay-up 18, which is then placed over the mold 10, or is the laminate 18 laid up directly over the mold 10. As shown in FIGS. 2 and 4, in a second step a first separate, substantially rigid, pressure-transferring element 20 configured as an elongate bar with substantially the same profile as the groove-like recess 12 is placed over the lay-up 18 at a position above the recess 12. The pressure-transferring element 20 has a first surface 21 facing the lay-up 18 of the composite material, and a second surface 22 with separated surface sections 24, 26 adapted to be engaged by an outer, flexible, evacuateable membrane 28 made of e.g. silicone, which is placed over the lay-up 18 and the pressure-transferring element 20 for sealingly enclosing the lay-up 18 and the pressure-transferring element 20. By "engaged" is in this application meant that the membrane 28 lies against the separated surface sections 24, 26 for the purpose of depressing the element 20. The abutment is more or less hard against the separated surface sections 24, 26. Thus, the separated surface sections 24, 26 may be considered to be depressed by the membrane 28.

The element 20 has a substantially convex web portion 29 and contiguous, substantially concave flange portions 30, 32, when referring to the first surface 21, for forming the local, sharply curved portion in the fiber-reinforced composite material.

Referring to the second surface 22, the element 20 has a substantially concave web portion 33 opposite the convex web portion 29 on the first side. In the same way, the second surface 22 has convex flange portions corresponding to the concave flange portions 30,32 on the first surface 21. The convex flange portions form the separated surface sections 24, 26. Between the concave web portion 33 and the convex flange portions follow substantially linear or slightly curved parts 63, 64 as shown in FIG. 6 and likewise on the first surface 21, between the convex web portion 29 and the concave flange portions 30, 32.

Figure 3:
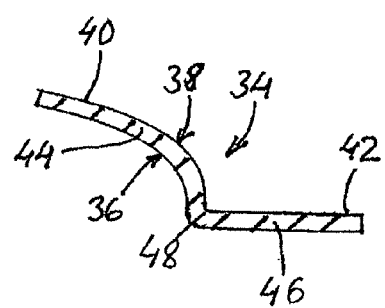
FIG. 3 is a schematic enlarged cross-sectional view of another substantially rigid pressure-transferring tool element for forming in the right part of FIG. 1 a second locally placed, sharply curved portion in an article of fiber-reinforced composite material.

Likewise, as seen in FIG. 3, a second separate, substantially rigid pressure-transferring element 34 configured as an elongate bar with substantially the same profile as the second sharply curved profile 14 of the mold 10 is placed over the lay-up 18 at a position above second profile 14. The second element 34 also has a first surface 36 facing the lay-up 18 of the composite material, and a second surface 38 with separated surface sections 40, 42 adapted to be engaged by the outer evacuateable membrane 28 which, in a third step, is placed over the lay-up 18 and the pressure-transferring elements 20, 34 for sealingly enclosing the lay-up 18 and the pressure-transferring elements 20, 34. The second element 34 has a first curved section 44 which is sharply bent into a substantially flat section 46 over a transition 48 having a small radius.

Figure 5:
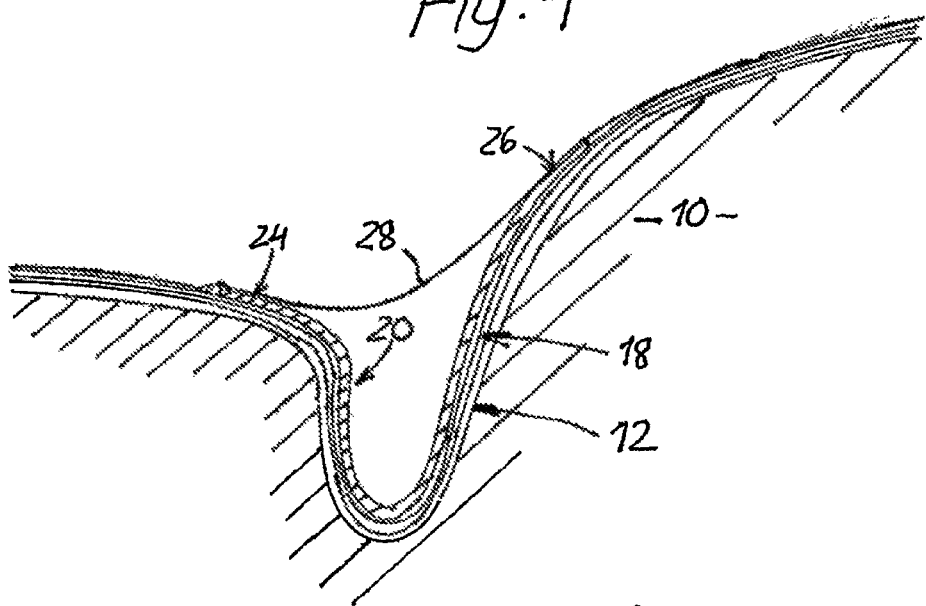
FIG. 5 is a schematic view similar to FIG. 4 but illustrates the assembly in a finished compressed state on the mold surface before an optional heat treatment step of the assembly.

As shown in FIG. 5, when the space between the membrane 28 and the lay-up 18 in a fourth step is evacuated from air, the membrane 28 will apply a pressure directly on the lay-up 18 and on the separated surface sections 24, 26 of the first element 20 and the separated surface sections 40, 42 of the second element 34 (not shown) which is sufficient for forcing the lay-up 18 to be accurately depressed by the first and second rigid elements 20 and 34 into the respective sharply curved sections 12 and 14 of the mold 10. Normally, the flexible membrane 28 is not by itself capable of depressing the lay-up 18 into such sharply curved sections of the mold. However, due to the stiff structure of the pressure-transferring elements 20, 34, the membrane 28 needs only engage the separated surface sections 24, 26, 40, 42 of the elements 20, 34 in order to achieve a proper depression of the lay-up 18 into the sharply curved sections of the mold. Thus, when evacuated, the membrane 28 will depress the lay-up 18 to fully conform to the shape of the mold 10.

Then, the depressed laminate 18 in the evacuated assembly is cured, e.g. by inserting the assembly in an oven (not shown). Although not normally necessary, the heat treatment of the laminate 18 may include a further step of subjecting the membrane 28 and the laminate 18 to a supplementary external pressure in an autoclave. The assembly is thereafter dismantled and the cured product is separated from the mold 10. Alternately, the depressed laminate 18 may be separated from the mold 10, pressure-transferring elements 20, 34 and the membrane 28 before curing the formed, depressed laminate product in a separate step.

Thus, by using a separate, substantially rigid pressure-transferring element 20; 34 for depressing the lay-up 18 locally into sharply curved sections 12; 14 of the mold 10, the article may be accurately formed in a more efficient and less time-consuming manner, since there is no need for separate pre-forming and heat-treatment steps of the article as were needed before.

Further, the present invention relates to the use of a tool according to above, wherein a method according to the present invention is used.

The invention claimed is:

1. A method of manufacturing an article of fiber-reinforced composite material having at least one locally placed curved portion, wherein the curved portion comprises a convex web portion and contiguous concave flange portions, said method comprising:

laying up a plurality of pre-impregnated fiber sheets to form a laminate over a surface of a mold which corresponds to the surface of the article to be formed, placing a separate, substantially rigid pressure-transferring element over the laminate at the location of the at least one locally placed, curved portion of the mold surface, said pressure-transferring element having an inner surface facing the laminate and configured in correspondence with the profile of said curved portion of the mold, placing a flexible membrane over the laminate and over outer, separated surface sections of the at least one pressure-transferring element, evacuating air from a space between the membrane and the laminate so as to cause the membrane to depress the laminate to fully conform to the shape of the mold surface by exerting a pressure directly on the laminate and indirectly by exerting a pressure on the outer, separated surfaces of the intermediate pressure-transferring element, wherein the membrane only engages the separated surface sections of the elements, thereby locally depressing the laminate into said curved portion of the mold, and dismantling the assembly.

2. The method according to claim 1, further comprising:

curing the depressed laminate before dismantling the assembly.

3. The method according to claim 2, the curing further comprises subjecting the membrane and the laminate to a supplementary external pressure.

4. The method according to claim 3, wherein the supplementary external pressure is applied in an autoclave.

5. A method for forming in an article of fiber-reinforced composite material at least one locally placed curved portion, wherein the curved portion comprises a convex web portion and contiguous concave flange portions, wherein the article is formed using a tool comprising a substantially rigid, pressure-transferring element having a first surface to be faced against a lay-up of the composite material and configured with a profile corresponding to said at least one curved portion to be formed in the article, and a second surface with separated surface sections adapted to be engaged by an evacuateable membrane for enclosing the lay-up of fiber-reinforced composite material and the pressure-transferring element, wherein the first surface of the pressure-transferring element has a convex web profile and contiguous concave flange portions for forming a locally curved portion in the lay-up of fiber-reinforced composite material, the method comprising:

laying up a plurality of pre-impregnated fiber sheets to form a laminate over a surface of a mold which corresponds to the surface of the article to be formed, placing the separate, pressure-transferring element over the laminate at the location of the at least one locally placed, curved portion of the mold surface, said pressure-transferring element is configured in correspondence with the profile of said curved portion of the mold, placing a flexible membrane over the laminate and over outer, separated surface sections of the at least one pressure-transferring element, evacuating air from a space between the membrane and the laminate so as to cause the membrane to depress the laminate to fully conform to the shape of the mold surface by exerting a pressure directly on the laminate and indirectly by exerting a pressure on the outer, separated surfaces of the intermediate pressure-transferring element, wherein the membrane only engages the separated surface sections of the elements, thereby locally depressing the laminate into said curved portion of the mold, and dismantling the assembly.

6. The method according to claim 5, wherein the pressure-transferring element has the shape of an elongate rigid bar.

* * * * *